United States Patent
Teed-Gillen et al.

(10) Patent No.: US 9,113,432 B2
(45) Date of Patent: Aug. 18, 2015

(54) CROWDSOURCING BASED ON BASE STATION ALMANAC QUALITY

(71) Applicant: QUALCOMM Incorporated, San Diego, CA (US)

(72) Inventors: Lois A. Teed-Gillen, Dallas, TX (US); Weihua Gao, San Jose, CA (US); Kirk Allan Burroughs, Alamo, CA (US); Dominic Gerard Farmer, Los Gatos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 195 days.

(21) Appl. No.: 13/830,004

(22) Filed: Mar. 14, 2013

(65) Prior Publication Data
US 2014/0274113 A1    Sep. 18, 2014

(51) Int. Cl.
| | | |
|---|---|---|
| *H04M 1/00* | (2006.01) | |
| *H04W 64/00* | (2009.01) | |
| *H04W 28/02* | (2009.01) | |
| *G01S 5/00* | (2006.01) | |
| *H04W 4/02* | (2009.01) | |
| *H04W 4/20* | (2009.01) | |
| *G01S 5/02* | (2010.01) | |

(52) U.S. Cl.
CPC ............... *H04W 64/00* (2013.01); *G01S 5/00* (2013.01); *G01S 5/0027* (2013.01); *G01S 5/0242* (2013.01); *H04W 4/02* (2013.01); *H04W 4/20* (2013.01); *H04W 28/0226* (2013.01); *G01S 5/0236* (2013.01)

(58) Field of Classification Search
CPC .................................. H04W 4/02; H04W 4/20
USPC ............ 455/466, 456.1, 456.2, 456.3, 456.6, 455/446; 342/357.64, 357.43, 451, 357.42; 726/22; 707/736; 340/870.07, 870.02
See application file for complete search history.

(56) References Cited

U.S. PATENT DOCUMENTS

| | | | |
|---|---|---|---|
| 2007/0252761 A1 | 11/2007 | Koorapaty et al. | |
| 2009/0021426 A1* | 1/2009 | Yeh | ......................... 342/357.09 |
| 2011/0057836 A1 | 3/2011 | Ische et al. | |

(Continued)

FOREIGN PATENT DOCUMENTS

| | | |
|---|---|---|
| GB | 2480191 A | 11/2011 |
| WO | 2012166370 A1 | 12/2012 |

OTHER PUBLICATIONS

International Search Report and Written Opinion—PCT/US2014/018286—ISA/EPO—May 14, 2014.

*Primary Examiner* — Kiet Doan
(74) *Attorney, Agent, or Firm* — Silicon Valley Patent Group LLP

(57) ABSTRACT

Systems, apparatus and methods for a mobile device and a base station almanac server to throttle crowdsourcing information are presented. The crowdsourcing information is used to improve a location of a base station in a base station almanac. A portion of the base station almanac is provided to a mobile device. For example, the mobile device may identify its current cell and request the base station almanac. The mobile device records crowdsourcing information to identify, for each particular base station of at least one base station, a cellular identifier for the particular base station, optional ranging information between the particular base station and the mobile device, and an independent position of the mobile device. The independent position of the mobile device may be formed from global navigation satellite system (GNSS) or station signals independent of the at least one base station.

29 Claims, 7 Drawing Sheets

(56) References Cited

U.S. PATENT DOCUMENTS

| | | |
|---|---|---|
| 2011/0156951 A1 | 6/2011 | Bhattacharya et al. |
| 2011/0163914 A1 | 7/2011 | Seymour |
| 2012/0309376 A1 | 12/2012 | Huang et al. |
| 2013/0144879 A1* | 6/2013 | Kuehnel et al. ............... 707/736 |
| 2013/0252628 A1* | 9/2013 | Kuehnel .................... 455/456.1 |

* cited by examiner

Crowdsourcing throttle — Enable/disable

For example:

Enable = when available, periodically, or when memory block full

Disable = just discard, or save crowdsourcing information

Crowdsourcing throttle — level

For example:
0 = disabled
1 = once/240 hrs
2 = once/120 hrs
...
7 = once/1 hr

Quality of BS almanac — level

For example:
0 = very poor
1 = poor
2 = okay
3 = good or better

Crowdsourcing target client — Which mobile-types

For example:
0 = all mobile devices
1 = just smart phones
2 = just MS with unlimited data plan

FIG. 10

Crowdsourcing target BS — Which network-types

For example:
0 = all BS
1 = just LTE BSs
2 = just CDMA BSs
3 = just GSM BSs

FIG. 11

Crowdsourcing target results — What level of discrepancies

For example:
When greater that a threshold

FIG. 12

Second position of MS based on, for example, GNSS
×

If (distance between positions > threshold) then send crowdsourcing information

×
First position of MS based on ranging and the BS almanac

FIG. 13

Mobile device 400

Base station almanac server 500

CROWDSOURCING BASED ON BASE STATION ALMANAC QUALITY

CROSS-REFERENCE TO RELATED APPLICATIONS

This is the first application filed for the present technology.

BACKGROUND

I. Field of the Invention

This disclosure relates generally to systems, apparatus and methods for determining a base station position, and more particularly to determining a base station position based on crowdsourcing from mobile stations.

II. Background

Many applications require an estimate of a mobile station's position estimate. To acquire a position estimate, a mobile station may determine its position relative to three or more base stations assuming a location of each base station is already known. The base station locations may be communicated from the base stations to the mobile station. Alternatively, the base station locations may be communicated from a base station almanac (BS almanac) server to the mobile station via a base station. Inaccuracies in the BS almanac directly lead to inaccuracies in a position estimate of a mobile station. Therefore, a means is needed to refine a known location of a base station in a BS almanac.

BRIEF SUMMARY

Systems, apparatus and methods for a mobile device and a base station almanac server to throttle crowdsourcing information are presented. The crowdsourcing information is used to improve a location of a base station in a base station almanac. A portion of the base station almanac is provided to a mobile device. For example, the mobile device may identify its current cell and request the base station almanac. The mobile device records crowdsourcing information to identify, for each particular base station of at least one base station, a cellular identifier for the particular base station, optional ranging information between the particular base station and the mobile device, and an independent position of the mobile device. The independent position of the mobile device may be formed from global navigation satellite system (GNSS) or station signals independent of the at least one base station.

According to some aspects, disclosed is a method in a mobile device for throttling crowdsourcing data, the method comprising: receiving, from a base station almanac server, a base station almanac that is based on a current cell identifier; collecting crowdsourcing information for at least one base station, collecting comprising, for each particular base station of the at least one base station: identifying a cellular identifier for the particular base station; determining a position estimate of the mobile device that is independent of signals from the particular base station; and recording crowdsourcing information for the particular base station, wherein the crowdsourcing information comprises: the cellular identifier; and the position estimate of the mobile device; and sending, to the base station almanac server based on a crowdsourcing throttle for reporting the crowdsourcing information, the crowdsourcing information.

According to some aspects, disclosed is a method in a base station almanac server for throttling crowdsourcing data, the method comprising: receiving a current cell identifier for a mobile device; deriving a base station almanac that is based on the current cell identifier; sending, to the mobile device, the base station almanac; and receiving, based on a crowdsourcing throttle and, crowdsourcing information comprising, for a particular base station of each of at least one base station: a cellular identifier identifying the particular base station; and a position estimate of the mobile device that is independent of signals from the particular base station.

According to some aspects, disclosed is a mobile device for throttling crowdsourcing data, the mobile device comprising: a wireless wide area network (WWAN) transceiver configured to: receive, from a base station almanac server, a base station almanac that is based on a current cell identifier; receive, at a position for each particular base station of at least one base station, a cellular identifier of the particular base station; and send, to the base station almanac server and based on a crowdsourcing throttle, crowdsourcing information; a processor coupled to the WWAN transceiver and configured to determine a position estimate of the mobile device corresponding to the position when receiving the cellular identifier for each particular base station of the at least one base station, wherein the position estimate is independent of signals from the particular base station; wherein the crowdsourcing information comprises, for each particular base station of the at least one base station: the cellular identifier; and the position estimate corresponding to the cellular identifier.

According to some aspects, disclosed is a base station almanac server for throttling crowdsourcing data, the base station almanac server comprising: a network transceiver configured to: receive, based on a crowdsourcing throttle, crowdsourcing information, wherein the crowdsourcing information comprises, for each particular base station of at least one base station: a cellular identifier identifying the particular base station; and a position estimate of the particular mobile device, corresponding to the cellular identifier, wherein the position estimate is independent of signals from the particular base station; and send a base station almanac to the particular mobile device; and a processor coupled to the network transceiver and configured to: form the base station almanac based on a current cell identifier; and update a location estimate of a base station based the position estimate of the particular mobile device.

According to some aspects, disclosed is a mobile device for throttling crowdsourcing data, the mobile device comprising: means for receiving, from a base station almanac server, a base station almanac that is based on a current cell identifier; means for collecting crowdsourcing information for at least one base station, collecting comprising, for each particular base station of the at least one base station: means for identifying a cellular identifier for the particular base station; means for determining a position estimate of the mobile device that is independent of signals from the particular base station; and means for recording crowdsourcing information for the particular base station, wherein the crowdsourcing information comprises: the cellular identifier; and the position estimate of the mobile device; and means for sending, to the base station almanac server based on a crowdsourcing throttle for reporting the crowdsourcing information, the crowdsourcing information.

According to some aspects, disclosed is a base station almanac server for throttling crowdsourcing data, the base station almanac server comprising: means for receiving a current cell identifier for a mobile device; means for deriving a base station almanac that is based on the current cell identifier; means for sending, to the mobile device, the base station almanac; and means for receiving, based on a crowdsourcing throttle and, crowdsourcing information comprising, for a particular base station of each of the at least one base station: a cellular identifier identifying the particular base station; and a position estimate of the mobile device that is independent of signals from the particular base station.

According to some aspects, disclosed is a non-transitory computer-readable storage medium including program code stored thereon for a mobile device to throttle crowdsourcing data, comprising program code to: receive, from a base station almanac server, a base station almanac that is based on a current cell identifier; collect crowdsourcing information for at least one base station, the program code to collect comprising, for each particular base station of the at least one base station, code to: identify a cellular identifier for the particular base station; determine a position estimate of the mobile device that is independent of signals from the particular base station; and record crowdsourcing information for the particular base station, wherein the crowdsourcing information comprises: the cellular identifier; and the position estimate of the mobile device; and send, to the base station almanac server based on a crowdsourcing throttle for reporting the crowdsourcing information, the crowdsourcing information.

According to some aspects, disclosed is a non-transitory computer-readable storage medium including program code stored thereon for a base station almanac server to throttle crowdsourcing data, comprising program code to: receive, from a mobile device, a current cell identifier; derive a base station almanac that is based on the current cell identifier; send, to the mobile device and from the base station almanac server, the base station almanac; and receive, based on a crowdsourcing throttle and for at least one base station including a particular base station, crowdsourcing information at the base station almanac server, wherein the crowdsourcing information comprises a record comprising: a cellular identifier identifying the particular base station; and a position estimate of the mobile device that is independent of signals from the particular base station.

According to some aspects, disclosed is a method in a mobile device for throttling crowdsourcing data, the method comprising: receiving, from a base station almanac server, a base station almanac that is based on a current cell identifier; identifying, for each particular base station of at least three base stations, a cellular identifier for the particular base station; computing a first position estimate of the mobile device based on locations of the at least three base stations; determining a second position estimate of the mobile device, wherein the second position estimate of the mobile device is independent of signals from the at least three base stations; determining that a discrepancy exist from a difference of the first position estimate and the second position estimate being greater than a threshold; and sending crowdsourcing information for the at least three base stations, based on the discrepancy, to the base station almanac server; wherein the crowdsourcing information comprises: the cellular identifier for each particular base station of the at least three base stations; and the first position estimate and the second position estimate.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWING

Embodiments of the invention will be described, by way of example only, with reference to the drawings.

FIGS. 7-11 shown crowdsourcing information, in accordance with some embodiments of the present invention.

FIGS. 12-13 show a system using a threshold, in accordance with some embodiments of the present invention.

DETAILED DESCRIPTION

Figure 1:
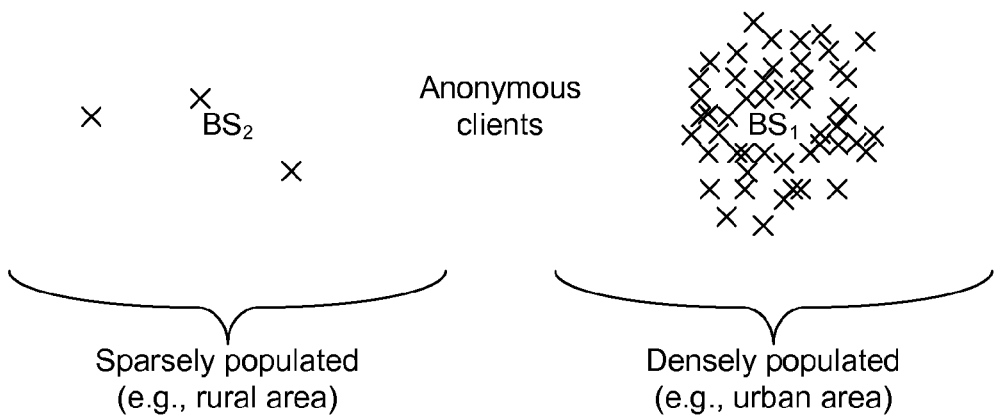
FIG. 1 illustrates a group of anonymous clients in both a sparsely populated area and a densely populated area.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

Position determination techniques described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, GLONASS or Compass may transmit a signal marked with a PN code that is distinguishable from PN codes transmitted by other SVs in the constellation (e.g., using different PN codes for each satellite as in GPS or using the same code on different frequencies as in GLONASS). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

As used herein, a mobile device, sometimes referred to as a mobile station (MS) or user equipment (UE), such as a cellular phone, mobile phone or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile device" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile device" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile device."

FIG. 1 illustrates a group of anonymous clients in both a sparsely populated area and a densely populated area. In a densely populated area, such as in an urban area, a base station (e.g., $BS_1$) supports many mobile devices (drawn with an 'x' symbol). In a sparsely populated area, such as in a rural area, a base station (e.g., $BS_2$) supports only a low number of mobile devices.

If a base station has an unknown or uncertain location to a base station almanac server, ranging information from three mobile devices having known locations (e.g., GNSS locations with low uncertainty) may be provided to the base station almanac server compute a location estimate of the base station. Ranging information from a greater number of mobile devices may be statically combined to average out uncertainties and more precisely determine a location estimate of the base station.

Alternatively, no ranging information is available. Assume a particular base station has an unknown or uncertain location to a base station almanac server. Also assume a large number of records exists where each record identifies the particular base station and a corresponding location of a mobile device. Each record is created by a mobile device determining crowdsourcing information, where the crowdsourcing information includes a cellular identifier identifying the particular base station and a position from the mobile device (e.g., GNSS locations with low uncertainty). The crowdsourcing information does not necessarily contain any ranging information. The base station almanac server may determine a location of the particular base station from a mean or median of the positions of the various mobile devices. For example, suppose a base station almanac server has 100 recent records identifying a particular base station as a serving base station and a corresponding GPS position estimate. The location of the particular base station may be approximated as the center of the cloud of 100 GPS positions. For example, the base station almanac server may compute a location estimate of the base station as a mean or median of the locations of 100 mobile device positions. Thereby, positioning information from a great number of mobile devices may be statically combined to average out uncertainties and more precisely determine a location estimate of the base station.

In turn, the improved location estimate of a particular base station may be included in future base station almanac responses. A base station almanac server maintains and updates a base station almanac containing an identity of each cell and a location estimate (e.g., latitude, longitude and altitude) with a corresponding uncertainty of each cell.

When ranging information is part of crowdsourcing information, each mobile device participating in crowdsourcing (also referred to as anonymous clients) provides its position (e.g., a GNSS position or other position estimate independent of a target base station) and a range to the target base station. In sparsely populated areas, the base station almanac server may receive an adequate number of records containing cell identification, optional ranging information from a mobile position, and a position estimate of the mobile device. In densely populated areas, however, the base station almanac server may be overwhelmed with duplicate data (records from the same position estimates from different mobile devices), which taxes the processing power of the base station almanac server, unnecessarily occupies channel bandwidth and consumes processing power on the mobile device.

Figure 2:
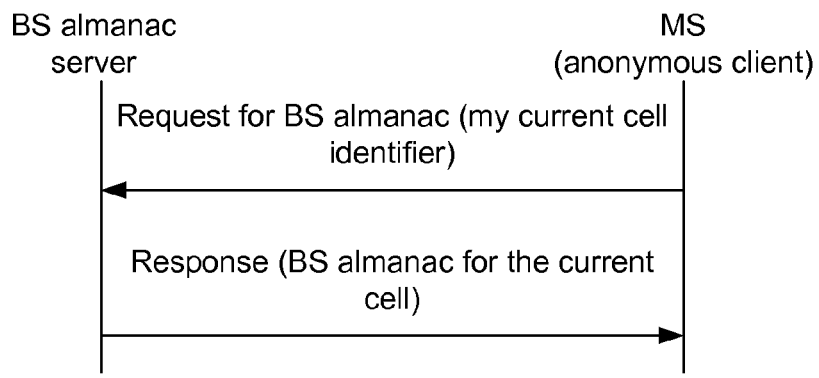
FIG. 2 shows a mobile station obtaining a BS almanac in a conventional system.

FIG. 2 shows a mobile station obtaining a BS almanac in a conventional system. In a conventional system, a mobile device, such as a mobile station or MS, sends a request for a base station almanac to a base station almanac server. The request message contains information identifying a current cell of the mobile device. The base station almanac server receives the request and, based on the current cell identifier of the mobile device, forms base station almanac information tailored to the cell identifier. The base station almanac server then sends a response message containing the base station for the current cell.

Figure 3:
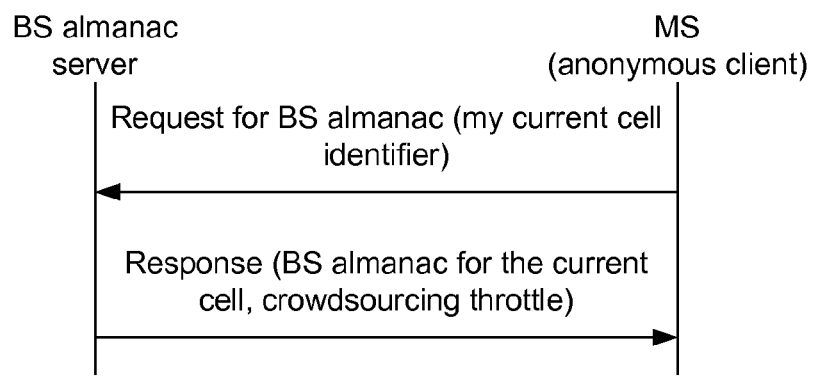
FIG. 3 shows a mobile station obtaining a BS almanac with a crowdsourcing throttle, in accordance with some embodiments of the present invention.

FIG. 3 shows a mobile station obtaining a BS almanac with a crowdsourcing throttle, in accordance with some embodiments of the present invention. The mobile device (shown as an MS) sends a conventional request for a base station almanac for the current cell from a base station almanac server. The base station almanac server determines which part of its entire base station almanac to form, based on the current cell of the mobile device an abridged base station almanac. The base station almanac server sends a response message containing the abridged base station almanac to the mobile device. The response message also contains a crowdsourcing throttle.

A crowdsourcing throttle may be implicit or explicit. When implicit, a mobile device does not receive a crowdsourcing throttle as a message from a base station almanac server. Instead, the mobile device has been configured to report back based on conditions of the network, conditions of the mobile device, conditions of the position estimate, or the like. For example, a mobile device having an unlimited data plan may be configured to periodically (e.g., at a defined period or a rate of once every week) report back all records of base stations seen by the mobile device.

When an explicit crowdsourcing throttle command is communicated from a base station almanac server to a mobile device, the crowdsourcing throttle tells the mobile device if crowdsourcing is enabled and how and/or when to report back to the base station almanac server with a cellular identifier, ranging information and a position of the mobile station. In some embodiments, the cellular identifier unambiguously identifies a cell. As previously mentioned, a request message includes a cell identifier. If the cell identifier represents a cell needing a more precise location, the base station almanac server may send a crowdsourcing throttle.

Figure 4:
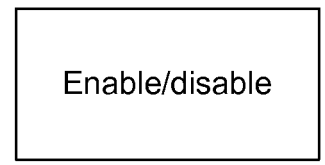
FIGS. 4-6 illustrate various crowdsourcing throttles, in accordance with some embodiments of the present invention.
Figure 5:
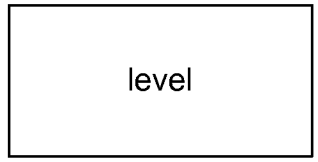
Figure 6:

FIGS. 4-6 illustrate various crowdsourcing throttles, in accordance with some embodiments of the present invention. In FIG. 4, a crowdsourcing throttle may include a flag to enable and disable crowdsourcing in a mobile device. For example, when crowdsourcing is enabled, a mobile device may send crowdsourcing information: (1) when available; (2) periodically; or (3) when a block of memory on the mobile device's is full. When crowdsourcing is disabled, a mobile device may either just discard crowdsourcing information or save crowdsourcing information for a later time.

In FIG. 5, a crowdsourcing throttle may include a level that indicates a period. For example, a zero value disables crowdsourcing, crowdsourcing information is sent every 240 hours for a one value, every 120 hours for a two value, and so on, and every hour for a value of seven. Other values and number of levels may indicate different periodical values.

In FIG. 6, a quality of the base station almanac is indicated by a level. For example, zero indicates a very poor quality, a one indicates a poor quality, a two indicates an okay or acceptable quality, and a three indicates a good or better quality of the base station almanac. Other gradients and number of levels are possible.

Figure 7:
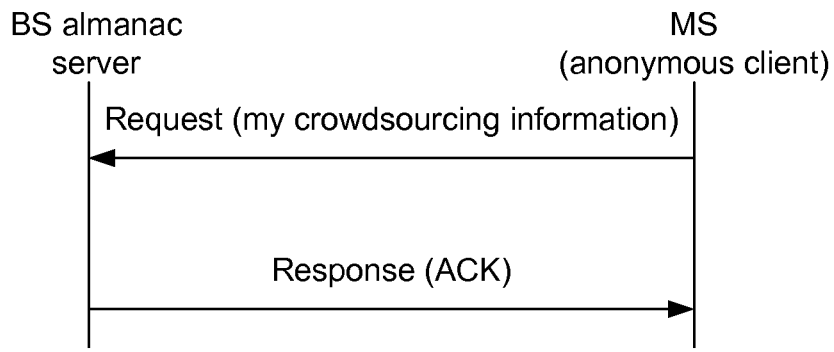
Figure 8:
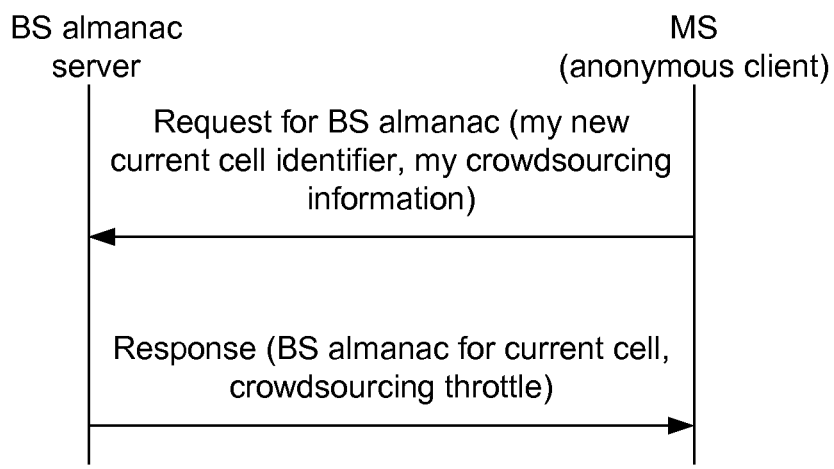

FIGS. 7-11 shown crowdsourcing information, in accordance with some embodiments of the present invention. In FIG. 7, a mobile device sends a request including collected crowdsourcing information. The collected crowdsourcing information may be for a single base station up to all base stations seen from a mobile device's position. Alternative, the collected crowdsourcing information may be for multiple positions of the mobile device of time. A base station almanac server receives the request and compiles the crowdsourcing information for use in improving locations of one or more base stations recorded in the base station almanac. The base station almanac server may respond to the mobile device with an acknowledgement (ACK) message. By receiving this ACK message, the mobile device knows the base station almanac server received the crowdsourcing message.

In FIG. 8, the mobile device again sends a request message. The request message requests a base station almanac (similar to the request shown in FIG. 3) from the base station almanac server. This request message, however, serves a dual role. That is, the request message combines the base station almanac requesting function (described above with reference to FIG. 3) and the crowdsourcing reporting function (described above with reference to FIG. 7). As such, the request messing includes a cell identifier for a new current cell (new current cell identifier) and also the crowdsourcing information collected by the mobile device. In response, the base station almanac server determines what base station almanac is appropriate for the new current cell and also what kind of crowdsourcing throttle is needed for that new current cell. The base station almanac server includes in a response message both the determined base station almanac appropriate for the new current cell and the crowdsourcing throttle.

Figure 9:
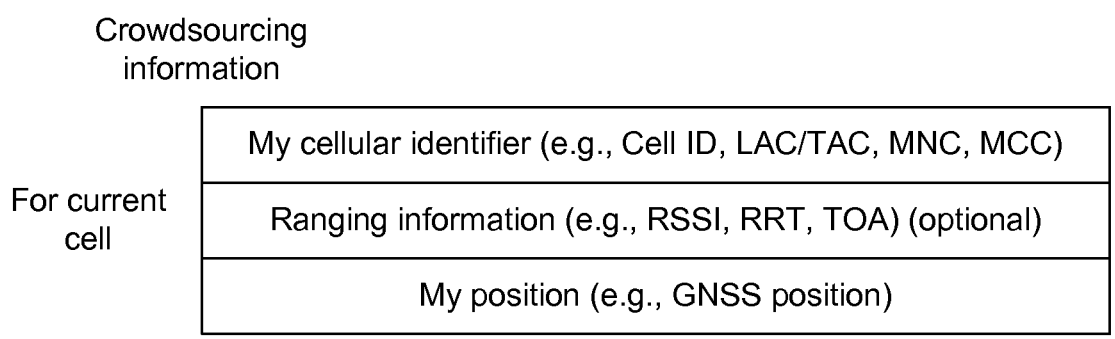

In FIG. 9, the crowdsourcing information is illustrated. The crowdsourcing information includes record having an identifier of a cell, optional ranging information, and the position of the mobile device. The crowdsourcing information may include multiple of such records representing two or more base stations that can be seen from a current or previous position of the mobile device and/or representing two or more base stations that have been seen at different positions of the mobile device. The cellular identifier distinguishes one cell from other cells. The cellular identifier may provide a unique and unambiguous identifier to only one base station. Alternative, the cellular identifier may provide an ambiguous identifier of a base station.

The cellular identifier may include a Cell ID. The cellular identifier may also include a local area code (LAC), tracking area code (TAC), a system identity (SID) and/or a network identity (NID). The cellular identifier may also include a mobile network code (MNC). The cellular identifier may also include a mobile country code (MCC). If the cellular identifier includes both an MNC and an MCC, the combination may be represented by a public land mobile network (PLMN=MCC+MNC). If the cellular identifier includes both a TAC and a PLMN, the combination may be represented by a tracking area indicator (TAI=PLMN+TAC).

The ranging information may include signal strength, such as a received signal strength indication (RSSI). The signal strength may be an absolute value or a relative value, such as a path loss. The signal strength may be converted from a signal level or power level to a distance (e.g., via a heat map). The ranging information may include a time-of-flight value, such as a relative time value (e.g., one-way time (OWT), round-trip time (RTT)) or an absolute value (e.g., time of arrival (TOA)). The time-of-flight value may be converted from a time to a distance by multiplying by the speed of light. The ranging information may a combination of signal strength(s) and/or time-of-flight value(s).

The position may include a GNSS position (e.g., a GPS position) of the mobile device. Alternatively, the position may be formed with ranging information to base stations and access points with low location uncertainty and excluding the base station identified by the cellular identifier. Alternatively, no ranging information is used and a location of a base station is determined to be the center of a cluster of mobile device positions.

The crowdsourcing information may also include additional information such as a base station's frequency or frequencies used by the identified cell, identifiers of its neighbors, a modulation mode or network type, a PN code and/or a frequency hopping pattern. The additional information may be used to further identify an ambiguously identified cell.

In FIG. 10, the crowdsourcing throttle is shown to throttle based on a type of client or mobile device. That is, the crowdsourcing throttle may identify that a command applies to certain types of mobile devices. For example, the crowdsourcing throttle applies to all mobile devices (0), just smart phones (1), just mobile devices with an unlimited data plan (2), or a combination of types of mobile devices.

In FIG. 11, the crowdsourcing throttle is shown to throttle based on a type of base station. That is, the crowdsourcing throttle may inform a mobile device to collect crowdsourcing information from a certain sort of base station(s). For example, the crowdsourcing throttle indicates that a command to collect crowdsourcing information applies to all base stations (0), just LTE base stations (1), just CDMA base stations (2), just GSM base stations (3), or a combination of types of base stations.

FIGS. 12-13 show a system using a threshold, in accordance with some embodiments of the present invention. In FIG. 12, the crowdsourcing throttle may be indicated as target threshold of results derived from ranging information and an independently derived position of the mobile device. For example, ranging information from three or more base stations indicates a first position of the mobile device. A second position of the mobile device is formed from GNSS measurements or base stations that are independent of the cells used for ranging. If a difference between first position and the second position is greater than a threshold, the mobile device reports this discrepancy as crowdsourcing information.

In FIG. 13, a first position of the mobile device is based on ranges to three or more base stations. The location of the base stations is found in the base station almanac. A second position of the mobile device is computed from a different set of base stations or access points, or alternatively, from GNSS measurements (e.g., GPS measurements). If the distance between the first position and the second position is greater than a threshold, the mobile device sends this information as crowdsourcing information to a base station almanac server. The base station almanac server may use this crowdsourcing information to determine or refine a location of one or more base stations. In some embodiments, data used to compute the first position is independent from data used to compute the second position.

Figure 14:
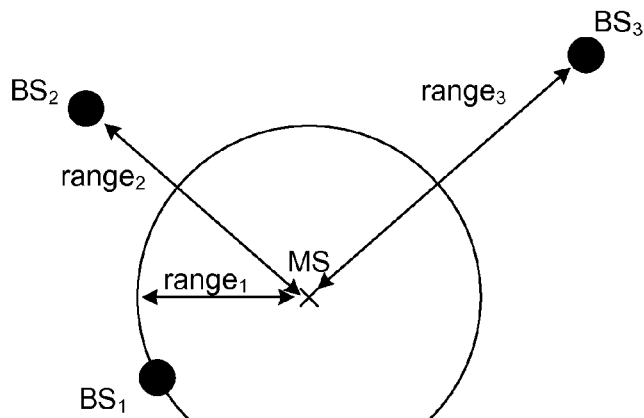
FIGS. 14-15 show ranging information between mobile stations and base stations, in accordance with some embodiments of the present invention.
Figure 15:
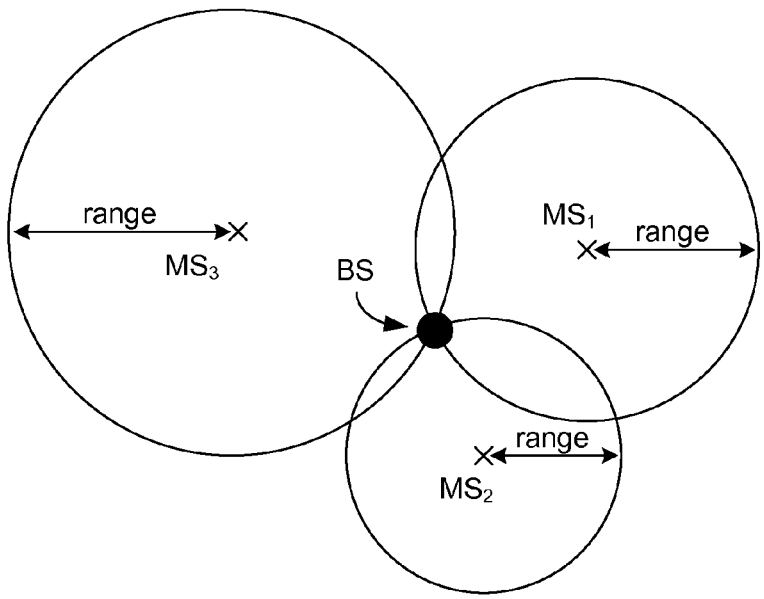

FIGS. 14-15 show ranging information between mobile stations and base stations, in accordance with some embodiments of the present invention. In FIG. 14, crowdsourcing information is shown from the point of a mobile device. For example, the mobile device, from a single position, may "see" an RF signal from each of three or more base stations ($BS_1$, $BS_2$ and $BS_3$). The mobile device determines range information ($range_1$, $range_2$ and $range_3$) to the three base stations ($BS_1$, $BS_2$ and $BS_3$), respectively. In this case, the mobile device forms three records, one for each base station, for the crowdsourcing information. From ranging information for three base stations, the mobile device may determine a first position of the mobile device. With more than three base stations, the mobile device may apply an over-determined algorithm to find the first position. To determine the second position, the mobile device may use GNSS signals (such as from a GPS receiver) or three or more additional base stations with lower uncertainty than the first three base stations ($BS_1$, $BS_2$ and $BS_3$). At this or a later point, the mobile device may report the records as crowdsourcing information. Alternatively, the mobile device may only report the records if the discrepancy between the first position and the second position is greater than a threshold.

In FIG. 15, crowdsourcing information is shown from the point of a base station. A base station almanac server accesses one or more records from records of crowdsourcing information. That is, the base station almanac server determines that the records all apply to the same base station. Ranging information from the mobile devices ($MS_1$, $MS_2$ and $MS_3$) determines a location of the base station. Ranging information from four or more mobile devices also determines a location of the base station via application of an over-determined algorithm. If the location of the base station is unknown in the base station almanac, the base station almanac server may use the location as determined from the ranging information. If the location of the base station is known in the base station almanac, the base station almanac server may use the location as determined from the ranging information to refine or adjust the known location of the base station.

Figure 16:
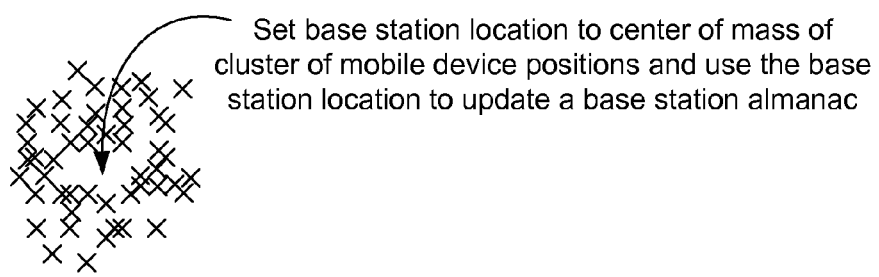
FIG. 16 illustrates a clustering algorithm, in accordance with some embodiments of the present invention.

FIG. 16 illustrates a clustering algorithm, in accordance with some embodiments of the present invention. Crowdsourcing information includes records from a plurality of mobile devices. A large number of records contain a cellular identifier of the same target base station and positions of various mobile devices. In this case, the crowdsourcing information does not include ranging information or the ranging information is not used. A center of mass, average, average weighted by uncertainty, mean or median is computed from the positions of various mobile devices. The computed center of mass, or the like, may be used as the location of the target base station. Alternatively, the computed center of mass may be used to adjust or refine a location of the target base station as found in a base station almanac.

Figure 17:
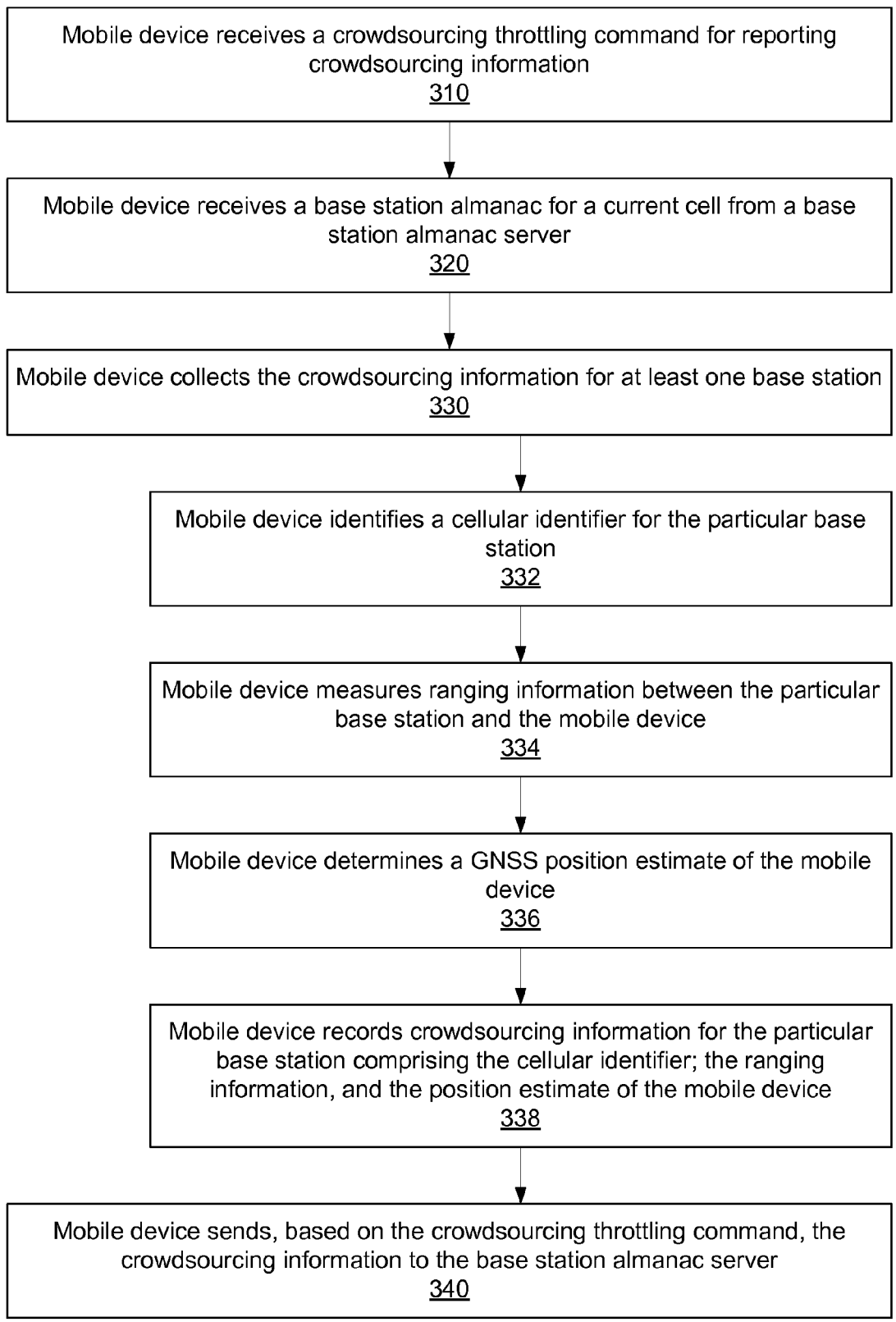
FIG. 17 shows a method to communicate crowdsourcing information, in accordance with some embodiments of the present invention.

FIG. 17 shows a method to communicate crowdsourcing information, in accordance with some embodiments of the present invention. At 310, a mobile device receives a crowdsourcing throttling command for reporting crowdsourcing information. At 320, the mobile device receives a base station almanac that is based in a current cell from a base station almanac server.

At 330, the mobile device collects the crowdsourcing information for at least one base station as described below in step 332 to 338. At 332, the mobile device identifies a cellular identifier for the particular base station. At 334, the mobile device measures ranging information between a particular base station and the mobile device. At 336, the mobile device determines a GNSS position estimate of the mobile device or other position estimate independent from the particular base station(s). At 338, the mobile device records the crowdsourcing information for the particular base station. The crowdsourcing information comprising the cellular identifier, the ranging information and the position estimate of the mobile device.

At 340, the mobile device sends, based on the crowdsourcing throttling command, the crowdsourcing information to the base station almanac server.

Figure 18:
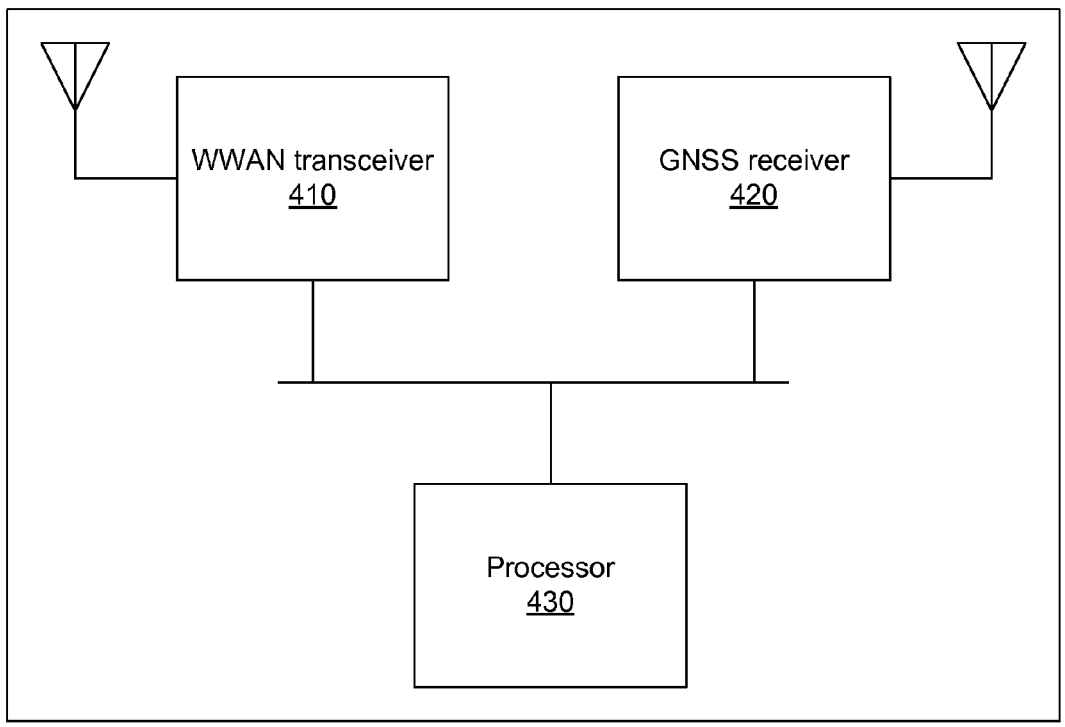
FIGS. 18-19 illustrate a mobile station and a base station almanac server, respectively, in accordance with some embodiments of the present invention.
Figure 19:
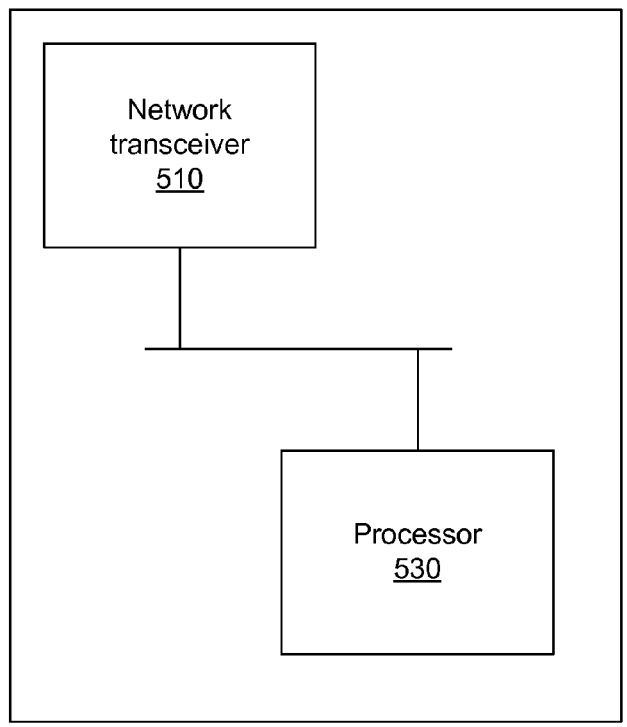

FIGS. 18-19 illustrate a mobile station and a base station almanac server, respectively, in accordance with some embodiments of the present invention. In FIG. 18, the mobile device 400 includes a WWAN transceiver 410, an optional GNSS receiver 420, and a processor 430 coupled to the WWAN transceiver 410 and the GNSS receiver 420. The processor 430 executes code or instructions to perform functions of a mobile device 400 described herein.

In FIG. 19, the base station almanac server 500 includes a network transceiver 510 for coupling to a mobile device 400. The base station almanac server 500 also includes a processor 530 coupled to the network transceiver 510. The processor 530 executes code or instructions to perform functions of a base station almanac server 500 described herein.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed is:

1. A method in a mobile device for throttling crowdsourcing data, the method comprising:
  receiving, from a base station almanac server, a base station almanac that is based on a current cell identifier;
  collecting crowdsourcing information for at least one base station, collecting comprising, for each particular base station of the at least one base station:
    identifying a cellular identifier for the particular base station;
    determining a position estimate of the mobile device that is independent of signals from the particular base station; and
    recording crowdsourcing information for the particular base station, wherein the crowdsourcing information comprises:
      the cellular identifier; and
      the position estimate of the mobile device; and
  sending, to the base station almanac server based on a crowdsourcing throttle for reporting the crowdsourcing information, the crowdsourcing information.

2. The method of claim 1, further comprising receiving a crowdsourcing throttling command comprising the crowdsourcing throttle.

3. The method of claim 2, wherein the crowdsourcing throttle indicates a quality of the base station almanac.

4. The method of claim 2, wherein the crowdsourcing throttle indicates, for mobile devices using a network, which network-types are affected by the crowdsourcing throttle.

5. The method of claim 1, wherein the crowdsourcing throttle indicates enable/disable of sending the crowdsourcing information.

6. The method of claim 1, wherein the crowdsourcing throttle indicates a level for sending the crowdsourcing information, wherein the level comprises at least four levels.

7. The method of claim 6, wherein the level comprises a rate for sending the crowdsourcing information.

8. The method of claim 1, wherein the crowdsourcing throttle indicates which mobile-types are affected by the crowdsourcing throttle.

9. The method of claim 1, wherein the crowdsourcing throttle indicates what level of discrepancies are affected by the crowdsourcing throttle.

10. The method of claim 1, further comprising:
  send the current cell identifier and a request for the base station almanac;
  receiving, based on requesting the base station almanac, the base station almanac and a crowdsourcing throttling command comprising the crowdsourcing throttle.

11. The method of claim 1, wherein collecting the crowdsourcing information comprises collecting the crowdsourcing information from each cell visited during a defined period.

12. The method of claim 1, wherein the cellular identifier comprises a Cell ID.

13. The method of claim 12, wherein the cellular identifier further comprises at least one of a location area code (LAC), a tracking area code (TAC), a system identity (SID) and a network identifier (NID).

14. The method of claim 1, wherein collecting further comprises:
  measuring ranging information between the particular base station and the mobile device;
  wherein the crowdsourcing information further comprises the ranging information.

15. The method of claim 1, wherein the position estimate of the mobile device comprises a global navigation satellite system (GNSS) position estimate.

16. The method of claim 15, wherein the GNSS position estimate comprises a global positioning system (GPS) position estimate.

17. The method of claim 1, wherein the position estimate of the mobile device comprises a position estimate based on base station signals.

18. The method of claim 1, wherein sending the crowdsourcing information comprises sending, with the crowdsourcing information, a request for the base station almanac based on a new current cell identifier.

19. The method of claim 1, wherein the crowdsourcing information for the particular base station further comprises a base station frequency of the particular base station.

20. The method of claim 1, further comprising:
  receiving, from the particular base station, a latitude and a longitude of the particular base station;
  wherein the crowdsourcing information for the particular base station further comprises the latitude and the longitude.

21. A mobile device for throttling crowdsourcing data, the mobile device comprising:
  means for receiving, from a base station almanac server, a base station almanac that is based on a current cell identifier;
  means for collecting crowdsourcing information for at least one base station, collecting comprising, for each particular base station of the at least one base station:
    means for identifying a cellular identifier for the particular base station;
    means for determining a position estimate of the mobile device that is independent of signals from the particular base station; and
    means for recording crowdsourcing information for the particular base station, wherein the crowdsourcing information comprises:
      the cellular identifier; and
      the position estimate of the mobile device; and
  means for sending, to the base station almanac server based on a crowdsourcing throttle for reporting the crowdsourcing information, the crowdsourcing information.

22. The mobile device of claim 21, further comprising means for receiving a crowdsourcing throttling command comprising the crowdsourcing throttle.

23. The mobile device of claim 21, further comprising means for sending the current cell identifier and requesting the base station almanac.

24. The mobile device of claim 21, further comprising:
  means for measuring ranging information between the particular base station and the mobile device;
  wherein the crowdsourcing information further comprises the ranging information.

25. The mobile device of claim 21, wherein the position estimate of the mobile device is based on global navigation satellite system (GNSS) signals.

26. The mobile device of claim 21, wherein the position estimate of the mobile device is based on base station signals.

27. A non-transitory computer-readable storage medium including program code stored thereon for a mobile device to throttle crowdsourcing data, comprising program code to:
  receive, from a base station almanac server, a base station almanac that is based on a current cell identifier;
  collect crowdsourcing information for at least one base station, the program code to collect comprising, for each particular base station of the at least one base station, code to:
    identify a cellular identifier for the particular base station;
    determine a position estimate of the mobile device that is independent of signals from the particular base station; and
    record crowdsourcing information for the particular base station, wherein the crowdsourcing information comprises:
      the cellular identifier; and
      the position estimate of the mobile device; and
  send, to the base station almanac server based on a crowdsourcing throttle for reporting the crowdsourcing information, the crowdsourcing information.

28. The non-transitory computer-readable storage medium of claim 27, wherein the program code further comprises program code to receive a crowdsourcing throttling command comprising the crowdsourcing throttle.

29. The non-transitory computer-readable storage medium of claim 27, wherein the program code further comprises program code to:
  measure ranging information, for each particular base station of the at least one base station, between the particular base station and the mobile device;
  wherein the crowdsourcing information further comprises the ranging information.

* * * * *